US012613580B2

(12) United States Patent
Sanders et al.

(10) Patent No.: US 12,613,580 B2
(45) Date of Patent: *Apr. 28, 2026

(54) SYSTEMS AND METHODS FOR GUIDING ACTORS USING A MOTION CAPTURE REFERENCE SYSTEM

(71) Applicant: Activision Publishing, Inc., Santa Monica, CA (US)

(72) Inventors: Michael Sanders, Los Angeles, CA (US); Xianchun Wu, Culver City, CA (US); Sven Pohle, Glendale, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,891

(22) Filed: Jun. 17, 2024

(65) Prior Publication Data

US 2024/0338082 A1    Oct. 10, 2024

Related U.S. Application Data

(63) Continuation of application No. 18/357,268, filed on Jul. 24, 2023, now Pat. No. 12,013,984, which is a
(Continued)

(51) Int. Cl.
*G06F 3/01* (2006.01)
*A63F 13/212* (2014.01)
(Continued)

(52) U.S. Cl.
CPC ............ *G06F 3/016* (2013.01); *A63F 13/212* (2014.09); *A63F 13/285* (2014.09); *G06F 3/011* (2013.01);
(Continued)

(58) Field of Classification Search
CPC ........ G06F 3/016; G06F 3/011; G06F 3/0482; G06F 3/04842; A63F 13/212;
(Continued)

(56) References Cited

U.S. PATENT DOCUMENTS 5,530,796 A    6/1996 Wang
5,561,736 A    10/1996 Moore
(Continued)

FOREIGN PATENT DOCUMENTS

AU        768367        3/2004
AU        2005215048    10/2011
(Continued)

OTHER PUBLICATIONS

Huang, Liang, "A Method of Speed Control during Over-ground Walking: Using a Digital Light-Emitting Diode Light Strip", Trans Tech Publications, 2013 (Year: 2013).
(Continued)

*Primary Examiner* — Ricardo Osorio
(74) *Attorney, Agent, or Firm* — Novel IP

(57) ABSTRACT

The specification discloses methods and systems for enabling users to configure one or more actuators in data communication with a user's computing device and positioned on a prop to generate and deliver feedback to a motion capture actor engaged with the prop. At least one graphical interface in the computing device is configured to enable the user to configure occurrence of at least one event during a scene, associate a time and duration of occurrence to the at least one event within an overall duration of the scene, select the prop, assign the at least one event and the associated time and duration of occurrence to at least one actuator on the prop, configure at least one parameter for the feedback, and activate the at least one actuator to generate
(Continued)

and deliver the feedback to the actor in response to an occurrence of the at least one event.

20 Claims, 7 Drawing Sheets

Related U.S. Application Data continuation of application No. 18/058,030, filed on Nov. 22, 2022, now Pat. No. 11,709,551, which is a continuation of application No. 17/123,976, filed on Dec. 16, 2020, now Pat. No. 11,537,209.

(60) Provisional application No. 62/949,388, filed on Dec. 17, 2019.

(51) Int. Cl.

| | |
|---|---|
| *A63F 13/285* | (2014.01) |
| *G06F 3/0482* | (2013.01) |
| *G06F 3/04842* | (2022.01) |
| *G06V 40/10* | (2022.01) |
| *G06V 40/20* | (2022.01) |

(52) U.S. Cl.

CPC ........ *G06F 3/0482* (2013.01); *G06F 3/04842* (2013.01); *G06V 40/103* (2022.01); *G06V 40/23* (2022.01)

(58) Field of Classification Search

CPC .... A63F 13/285; A63F 13/213; A63F 13/655; G06V 40/103; G06V 40/23

See application file for complete search history.

(56) References Cited

U.S. PATENT DOCUMENTS

| | | | |
|---|---|---|---|
| 5,563,946 | A | 10/1996 | Cooper |
| 5,685,775 | A | 11/1997 | Bakoglu |
| 5,706,507 | A | 1/1998 | Schloss |
| 5,708,764 | A | 1/1998 | Borrel |
| 5,736,985 | A | 4/1998 | Lection |
| 5,737,416 | A | 4/1998 | Cooper |
| 5,745,678 | A | 4/1998 | Herzberg |
| 5,768,511 | A | 6/1998 | Galvin |
| 5,825,877 | A | 10/1998 | Dan |
| 5,835,692 | A | 11/1998 | Cragun |
| 5,878,233 | A | 3/1999 | Schloss |
| 5,883,628 | A | 3/1999 | Mullaly |
| 5,900,879 | A | 5/1999 | Berry |
| 5,903,266 | A | 5/1999 | Berstis |
| 5,903,271 | A | 5/1999 | Bardon |
| 5,911,045 | A | 6/1999 | Leyba |
| 5,920,325 | A | 7/1999 | Morgan |
| 5,923,324 | A | 7/1999 | Berry |
| 5,969,724 | A | 10/1999 | Berry |
| 5,977,979 | A | 11/1999 | Clough |
| 5,990,888 | A | 11/1999 | Blades |
| 6,014,145 | A | 1/2000 | Bardon |
| 6,025,839 | A | 2/2000 | Schell |
| 6,059,842 | A | 5/2000 | Dumarot |
| 6,069,632 | A | 5/2000 | Mullaly |
| 6,081,270 | A | 6/2000 | Berry |
| 6,081,271 | A | 6/2000 | Bardon |
| 6,091,410 | A | 7/2000 | Lection |
| 6,094,196 | A | 7/2000 | Berry |
| 6,098,056 | A | 8/2000 | Rusnak |
| 6,104,406 | A | 8/2000 | Berry |
| 6,111,581 | A | 8/2000 | Berry |
| 6,134,588 | A | 10/2000 | Guenthner |
| 6,144,381 | A | 11/2000 | Lection |
| 6,148,328 | A | 11/2000 | Cuomo |
| 6,185,614 | B1 | 2/2001 | Cuomo |
| 6,201,881 | B1 | 3/2001 | Masuda |
| 6,222,551 | B1 | 4/2001 | Schneider |
| 6,271,842 | B1 | 8/2001 | Bardon |
| 6,271,843 | B1 | 8/2001 | Lection |
| 6,282,547 | B1 | 8/2001 | Hirsch |
| 6,311,206 | B1 | 10/2001 | Malkin |
| 6,334,141 | B1 | 12/2001 | Varma |
| 6,336,134 | B1 | 1/2002 | Varma |
| 6,337,700 | B1 | 1/2002 | Kinoe |
| 6,353,449 | B1 | 3/2002 | Gregg |
| 6,356,297 | B1 | 3/2002 | Cheng |
| 6,411,312 | B1 | 6/2002 | Sheppard |
| 6,426,757 | B1 | 7/2002 | Smith |
| 6,445,389 | B1 | 9/2002 | Bossen |
| 6,452,593 | B1 | 9/2002 | Challener |
| 6,462,760 | B1 | 10/2002 | Cox, Jr. |
| 6,469,712 | B1 | 10/2002 | Hilpert, Jr. |
| 6,473,085 | B1 | 10/2002 | Brock |
| 6,499,053 | B1 | 12/2002 | Marquette |
| 6,505,208 | B1 | 1/2003 | Kanevsky |
| 6,525,731 | B1 | 2/2003 | Suits |
| 6,549,933 | B1 | 4/2003 | Barrett |
| 6,567,109 | B1 | 5/2003 | Todd |
| 6,618,751 | B1 | 9/2003 | Challenger |
| RE38,375 | E | 12/2003 | Herzberg |
| 6,657,617 | B2 | 12/2003 | Paolini |
| 6,657,642 | B1 | 12/2003 | Bardon |
| 6,684,255 | B1 | 1/2004 | Martin |
| 6,717,600 | B2 | 4/2004 | Dutta |
| 6,734,884 | B1 | 5/2004 | Berry |
| 6,765,596 | B2 | 7/2004 | Lection |
| 6,781,607 | B1 | 8/2004 | Benham |
| 6,819,669 | B2 | 11/2004 | Rooney |
| 6,832,239 | B1 | 12/2004 | Kraft |
| 6,836,480 | B2 | 12/2004 | Basso |
| 6,886,026 | B1 | 4/2005 | Hanson |
| 6,948,168 | B1 | 9/2005 | Kuprionas |
| RE38,865 | E | 11/2005 | Dumarot |
| 6,993,596 | B2 | 1/2006 | Hinton |
| 7,028,296 | B2 | 4/2006 | Irfan |
| 7,062,533 | B2 | 6/2006 | Brown |
| 7,143,409 | B2 | 11/2006 | Herrero |
| 7,209,137 | B2 | 4/2007 | Brokenshire |
| 7,230,616 | B2 | 6/2007 | Taubin |
| 7,249,123 | B2 | 7/2007 | Elder |
| 7,263,511 | B2 | 8/2007 | Bodin |
| 7,287,053 | B2 | 10/2007 | Bodin |
| 7,305,438 | B2 | 12/2007 | Christensen |
| 7,308,476 | B2 | 12/2007 | Mannaru |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,503,007 | B2 | 3/2009 | Goodman |
| 7,506,264 | B2 | 3/2009 | Polan |
| 7,515,136 | B1 | 4/2009 | Kanevsky |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,596,596 | B2 | 9/2009 | Chen |
| 7,640,587 | B2 | 12/2009 | Fox |
| 7,667,701 | B2 | 2/2010 | Leah |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |

(56) References Cited

U.S. PATENT DOCUMENTS

| | | | |
|---|---|---|---|
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | D'Amora |
| 7,792,801 | B2 | 9/2010 | Hamilton, II |
| 7,796,128 | B2 | 9/2010 | Radzikowski |
| 7,808,500 | B2 | 10/2010 | Shearer |
| 7,814,152 | B2 | 10/2010 | McGowan |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,856,469 | B2 | 12/2010 | Chen |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |
| 7,921,128 | B2 | 4/2011 | Hamilton, II |
| 7,940,265 | B2 | 5/2011 | Brown |
| 7,945,620 | B2 | 5/2011 | Bou-Ghannam |
| 7,945,802 | B2 | 5/2011 | Hamilton, II |
| 7,970,837 | B2 | 6/2011 | Lyle |
| 7,970,840 | B2 | 6/2011 | Cannon |
| 7,985,138 | B2 | 7/2011 | Acharya |
| 7,990,387 | B2 | 8/2011 | Hamilton, II |
| 7,996,164 | B2 | 8/2011 | Hamilton, II |
| 8,001,161 | B2 | 8/2011 | George |
| 8,004,518 | B2 | 8/2011 | Fowler |
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |
| 8,019,797 | B2 | 9/2011 | Hamilton, II |
| 8,019,858 | B2 | 9/2011 | Bauchot |
| 8,022,948 | B2 | 9/2011 | Garbow |
| 8,022,950 | B2 | 9/2011 | Brown |
| 8,026,913 | B2 | 9/2011 | Garbow |
| 8,028,021 | B2 | 9/2011 | Reisinger |
| 8,028,022 | B2 | 9/2011 | Brownholtz |
| 8,037,416 | B2 | 10/2011 | Bates |
| 8,041,614 | B2 | 10/2011 | Bhogal |
| 8,046,700 | B2 | 10/2011 | Bates |
| 8,051,462 | B2 | 11/2011 | Hamilton, II |
| 8,055,656 | B2 | 11/2011 | Cradick |
| 8,056,121 | B2 | 11/2011 | Hamilton, II |
| 8,057,307 | B2 | 11/2011 | Berstis |
| 8,062,130 | B2 | 11/2011 | Smith |
| 8,063,905 | B2 | 11/2011 | Brown |
| 8,070,601 | B2 | 12/2011 | Acharya |
| 8,082,245 | B2 | 12/2011 | Bates |
| 8,085,267 | B2 | 12/2011 | Brown |
| 8,089,481 | B2 | 1/2012 | Shearer |
| 8,092,288 | B2 | 1/2012 | Theis |
| 8,095,881 | B2 | 1/2012 | Reisinger |
| 8,099,338 | B2 | 1/2012 | Betzler |
| 8,099,668 | B2 | 1/2012 | Garbow |
| 8,102,334 | B2 | 1/2012 | Brown |
| 8,103,640 | B2 | 1/2012 | Lo |
| 8,103,959 | B2 | 1/2012 | Cannon |
| 8,105,165 | B2 | 1/2012 | Karstens |
| 8,108,774 | B2 | 1/2012 | Finn |
| 8,113,959 | B2 | 2/2012 | De Judicibus |
| 8,117,551 | B2 | 2/2012 | Cheng |
| 8,125,485 | B2 | 2/2012 | Brown |
| 8,127,235 | B2 | 2/2012 | Haggar |
| 8,127,236 | B2 | 2/2012 | Hamilton, II |
| 8,128,487 | B2 | 3/2012 | Hamilton, II |
| 8,131,740 | B2 | 3/2012 | Cradick |
| 8,132,235 | B2 | 3/2012 | Bussani |
| 8,134,560 | B2 | 3/2012 | Bates |
| 8,139,060 | B2 | 3/2012 | Brown |
| 8,139,780 | B2 | 3/2012 | Shearer |
| 8,140,340 | B2 | 3/2012 | Bhogal |
| 8,140,620 | B2 | 3/2012 | Creamer |
| 8,140,978 | B2 | 3/2012 | Betzler |
| 8,140,982 | B2 | 3/2012 | Hamilton, II |
| 8,145,676 | B2 | 3/2012 | Bhogal |
| 8,145,725 | B2 | 3/2012 | Dawson |
| 8,149,241 | B2 | 4/2012 | Do |
| 8,151,191 | B2 | 4/2012 | Nicol, II |
| 8,156,184 | B2 | 4/2012 | Kurata |
| 8,165,350 | B2 | 4/2012 | Fuhrmann |
| 8,171,407 | B2 | 5/2012 | Huang |
| 8,171,408 | B2 | 5/2012 | Dawson |
| 8,171,559 | B2 | 5/2012 | Hamilton, II |
| 8,174,541 | B2 | 5/2012 | Greene |
| 8,176,421 | B2 | 5/2012 | Dawson |
| 8,176,422 | B2 | 5/2012 | Bergman |
| 8,184,092 | B2 | 5/2012 | Cox |
| 8,184,116 | B2 | 5/2012 | Finn |
| 8,185,450 | B2 | 5/2012 | McVey |
| 8,185,829 | B2 | 5/2012 | Cannon |
| 8,187,067 | B2 | 5/2012 | Hamilton, II |
| 8,199,145 | B2 | 6/2012 | Hamilton, II |
| 8,203,561 | B2 | 6/2012 | Carter |
| 8,214,335 | B2 | 7/2012 | Hamilton, II |
| 8,214,433 | B2 | 7/2012 | Dawson |
| 8,214,750 | B2 | 7/2012 | Hamilton, II |
| 8,214,751 | B2 | 7/2012 | Dawson |
| 8,217,953 | B2 | 7/2012 | Comparan |
| 8,219,616 | B2 | 7/2012 | Dawson |
| 8,230,045 | B2 | 7/2012 | Kawachiya |
| 8,230,338 | B2 | 7/2012 | Dugan |
| 8,233,005 | B2 | 7/2012 | Finn |
| 8,234,234 | B2 | 7/2012 | Shearer |
| 8,234,579 | B2 | 7/2012 | Do |
| 8,239,775 | B2 | 8/2012 | Beverland |
| 8,241,131 | B2 | 8/2012 | Bhogal |
| 8,245,241 | B2 | 8/2012 | Hamilton, II |
| 8,245,283 | B2 | 8/2012 | Dawson |
| 8,265,253 | B2 | 9/2012 | D'Amora |
| 8,310,497 | B2 | 11/2012 | Comparan |
| 8,334,871 | B2 | 12/2012 | Hamilton, II |
| 8,360,886 | B2 | 1/2013 | Karstens |
| 8,364,804 | B2 | 1/2013 | Childress |
| 8,425,326 | B2 | 4/2013 | Chudley |
| 8,442,946 | B2 | 5/2013 | Hamilton, II |
| 8,506,372 | B2 | 8/2013 | Chudley |
| 8,514,249 | B2 | 8/2013 | Hamilton, II |
| 8,554,841 | B2 | 10/2013 | Kurata |
| 8,607,142 | B2 | 12/2013 | Bergman |
| 8,607,356 | B2 | 12/2013 | Hamilton, II |
| 8,624,903 | B2 | 1/2014 | Hamilton, II |
| 8,626,836 | B2 | 1/2014 | Dawson |
| 8,692,835 | B2 | 4/2014 | Hamilton, II |
| 8,721,412 | B2 | 5/2014 | Chudley |
| 8,827,816 | B2 | 9/2014 | Bhogal |
| 8,838,640 | B2 | 9/2014 | Bates |
| 8,849,917 | B2 | 9/2014 | Dawson |
| 8,911,296 | B2 | 12/2014 | Chudley |
| 8,964,052 | B1 | 2/2015 | Wooley |
| 8,992,316 | B2 | 3/2015 | Smith |
| 9,067,116 | B1 | 6/2015 | Heikenen |
| 9,083,654 | B2 | 7/2015 | Dawson |
| 9,092,953 | B1 | 7/2015 | Mortimer |
| 9,152,914 | B2 | 10/2015 | Haggar |
| 9,205,328 | B2 | 12/2015 | Bansi |
| 9,286,731 | B2 | 3/2016 | Hamilton, II |
| 9,299,080 | B2 | 3/2016 | Dawson |
| 9,364,746 | B2 | 6/2016 | Chudley |
| 9,525,746 | B2 | 12/2016 | Bates |
| 9,583,109 | B2 | 2/2017 | Kurata |
| 9,645,646 | B2 | 5/2017 | Cowley |
| 9,652,037 | B2 * | 5/2017 | Rubin .................. B25J 11/003 |

(56) References Cited

U.S. PATENT DOCUMENTS

| | | | |
|---|---|---|---|
| 9,682,324 | B2 | 6/2017 | Bansi |
| 9,699,278 | B2 | 7/2017 | Richley |
| 9,759,803 | B2 | 9/2017 | O'Hagan |
| 9,764,244 | B2 | 9/2017 | Bansi |
| 9,789,406 | B2 | 10/2017 | Marr |
| 9,808,722 | B2 | 11/2017 | Kawachiya |
| 10,321,873 | B2 | 6/2019 | Connor |
| 10,373,342 | B1 | 8/2019 | Perez, III |
| 10,403,050 | B1 | 9/2019 | Beall |
| 10,437,658 | B2 | 10/2019 | Alonso |
| 10,602,200 | B2 | 3/2020 | Grant |
| 10,716,510 | B2 | 7/2020 | Connor |
| 10,732,797 | B1 * | 8/2020 | Perez, III .............. G06F 3/0482 |
| 11,113,892 | B2 | 9/2021 | Rozenblit |
| 2006/0017654 | A1 | 1/2006 | Romo |
| 2007/0217209 | A1 | 9/2007 | Wong |
| 2009/0113448 | A1 | 4/2009 | Smith |
| 2009/0324017 | A1 | 12/2009 | Gordon |
| 2010/0026809 | A1 | 2/2010 | Curry |
| 2011/0115709 | A1 | 5/2011 | Cruz-Hernandez |
| 2013/0198625 | A1 * | 8/2013 | Anderson ............... G06F 3/016 715/701 |
| 2014/0344725 | A1 | 11/2014 | Bates |
| 2015/0350628 | A1 | 12/2015 | Sanders |
| 2016/0191671 | A1 | 6/2016 | Dawson |
| 2016/0252326 | A1 | 9/2016 | Jones |
| 2017/0312614 | A1 | 11/2017 | Tran |
| 2018/0161671 | A1 * | 6/2018 | Heubel ................. A63F 13/212 |
| 2019/0291277 | A1 | 9/2019 | Oleynik |
| 2020/0020165 | A1 | 1/2020 | Tran |
| 2020/0297262 | A1 | 9/2020 | Chappell, III |

FOREIGN PATENT DOCUMENTS

| | | | |
|---|---|---|---|
| CA | 2143874 | | 6/2000 |
| CA | 2292678 | | 7/2005 |
| CA | 2552135 | | 7/2013 |
| CN | 1334650 | A | 2/2002 |
| CN | 1202652 | C | 10/2002 |
| CN | 1141641 | C | 3/2004 |
| CN | 1494679 | A | 5/2004 |
| CN | 1219384 | | 9/2005 |
| CN | 1307544 | | 3/2007 |
| CN | 100407675 | | 7/2008 |
| CN | 100423016 | C | 10/2008 |
| CN | 100557637 | | 11/2009 |
| CN | 101001678 | B | 5/2010 |
| CN | 101436242 | | 12/2010 |
| CN | 101801482 | B | 12/2014 |
| EP | 668583 | | 8/1995 |
| EP | 0627728 | B1 | 9/2000 |
| EP | 0717337 | B1 | 8/2001 |
| EP | 0679977 | B1 | 10/2002 |
| EP | 0679978 | B1 | 3/2003 |
| EP | 0890924 | B1 | 9/2003 |
| EP | 1377902 | B1 | 8/2004 |
| EP | 0813132 | B1 | 1/2005 |
| EP | 1380133 | B1 | 3/2005 |
| EP | 1021021 | B1 | 9/2005 |
| EP | 0930584 | B1 | 10/2005 |
| EP | 0883087 | B1 | 8/2007 |
| EP | 1176828 | B1 | 10/2007 |
| EP | 2076888 | B1 | 7/2015 |
| EP | 3333672 | A1 | 6/2018 |
| GB | 2339938 | | 10/2002 |
| GB | 2352154 | | 7/2003 |
| JP | 3033956 | B2 | 4/2000 |
| JP | 3124916 | B2 | 1/2001 |
| JP | 3177221 | B2 | 6/2001 |
| JP | 3199231 | B2 | 8/2001 |
| JP | 3210558 | B2 | 9/2001 |
| JP | 3275935 | | 2/2002 |
| JP | 3361745 | | 1/2003 |
| JP | 3368188 | B2 | 1/2003 |
| JP | 3470955 | B | 9/2003 |
| JP | 3503774 | | 12/2003 |
| JP | 3575598 | | 7/2004 |
| JP | 3579823 | B | 7/2004 |
| JP | 3579154 | B2 | 10/2004 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5734566 | B2 | 6/2015 |
| MY | 117864 | A | 8/2004 |
| SG | 55396 | | 12/1998 |
| WO | WO-9720305 | A1 * | 6/1997 ............. G06F 3/011 |
| WO | 2002073457 | | 9/2002 |
| WO | 20020087156 | | 10/2002 |
| WO | 2004086212 | | 10/2004 |
| WO | 2005079538 | | 9/2005 |
| WO | 2007101785 | | 9/2007 |
| WO | 2008037599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 | A1 | 8/2010 |
| WO | WO-2015100482 | A1 * | 7/2015 ............. A41D 13/12 |

OTHER PUBLICATIONS

Wagner, Kurt, "Here's what it's like to be scanned into an NBA video game", recode.com, Sep. 16, 2016 (Year: 2016).

* cited by examiner

300

302 — Scripting module generates a first GUI screen to prompt and enable an administrator to configure an occurrence of at least one event during a course of a scene 304 — The administrator uses the first GUI screen to associate a specific time of occurrence to the at least one event within an overall duration of the scene 306 — The scripting module generates a second GUI screen to prompt and enable the administrator to select a prop being worn, held and/or carried by the actor 308 — The scripting module generates a third GUI screen to prompt and enable the administrator to assign the at least one event and its associated time of occurrence to at least one actuator on the prop 310 — The administrator uses the third GUI screen to configure a plurality of parameters, attributes or characteristics of the haptic feedback to be generated by the at least one actuator 312 — The at least one actuator is activated or enabled to deliver haptic feedback to the actor in response to the at least one event occurring at the assigned specific time during the course of the scene

FIG. 3

SYSTEMS AND METHODS FOR GUIDING ACTORS USING A MOTION CAPTURE REFERENCE SYSTEM

CROSS-REFERENCE

The present application is a continuation application of U.S. patent application Ser. No. 18/357,268, titled "Systems and Methods for Guiding Actors Using a Motion Capture Reference System" and filed on Jul. 24, 2023, which is a continuation application of U.S. patent application Ser. No. 18/058,030, of the same title, filed on Nov. 22, 2022, and issued as U.S. Pat. No. 11,709,551 on Jul. 25, 2023, which is a continuation application of U.S. patent application Ser. No. 17/123,976, of the same title, filed on Dec. 16, 2020, and issued as U.S. Pat. No. 11,537,209 on Dec. 27, 2022, which, in turn, relies on, for priority, U.S. Patent Provisional Application No. 62/949,388, of the same title and filed on Dec. 17, 2019. The above-referenced applications are herein incorporated by reference in their entirety.

FIELD

The present application relates to a motion capture system. More particularly, the present application relates to a motion capture reference system that generates and delivers tactile haptic feedback or stimuli to a human actor corresponding to the manifestation of one or more events in a scene.

BACKGROUND

Motion capture (mocap) is the process of recording the movement of real objects, such as a human actor, in order to create source data that is used to conform or map the movement onto a computer graphics animation character or digital avatar of the object. A typical motion capture system uses one or more digital cameras to record the movement of the actor while illuminating a number of markers attached at a number of locations on a suit that the actor wears. A digital representation or rendering of the actor in motion is thereafter generated by analyzing the coordinates of the markers in the captured images and mapping them onto a corresponding computer graphics animation character.

Mocap offers advantages over traditional computer animation of a 3D model such as: a) enabling a preview of the spatial representation of the actor's movements in real-time or near real-time and/or b) allowing computer graphics (CG) animation characters to display more realistic and natural movement characteristics.

Notwithstanding the advantages of motion capture systems, it is often desired that a CG animation character perform and react, in a video game for example, in sync with the occurrence of one or more events in order to deliver more realistic performances. Accordingly, the actor must portray actions in response to events in a scene at near precise timing of occurrence of the events so that the in-sync actions can then be mapped on to the animation character. However, for the director and production team, it is very difficult to verbally or through audio-visual cues generate and deliver real-time or near real-time prompt, trigger or feedback explaining when the actor should react or perform in response to the events.

Therefore, there is a need to provide a physical reference system that enables an actor to perform in time synchronization with one or more events scripted to occur during the course of a scene in order to generate source motion capture data. It is also desirable for the reference system to be able to generate and deliver tactile haptic feedback or stimuli to the actor corresponding to the one or more events thereby directing and aiding the actor to not only perform in sync with the one or more events but also enable the actor to deliver more realistic performances. It is further desirable for the reference system to be intuitive and easy for the actor to follow.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a computer-implemented method of enabling a user to configure one or more actuators in data communication with a user's computing device, wherein the one or more actuators are positioned on a prop to generate and deliver feedback to an actor wearing, carrying or holding the prop, the method being implemented by the user's computing device executing a plurality of programmatic instructions and comprising: generating at least one graphical interface adapted to receive user inputs; receiving, via the at least one graphical interface, an identification of at least one event occurring during a course of a scene; associating, via the at least one graphical interface, at least a time of occurrence to the at least one event within an overall duration of the scene; receiving, via the at least one graphical interface, an identification of the prop; assigning, via the at least one graphical interface, the at least one event and the associated time of occurrence to at least one actuator on the prop; configuring, via the at least one graphical interface, at least one of a plurality of parameters of the feedback; and activating the at least one actuator to generate and deliver the feedback to the actor in response to the at least one event taking place at the associated time of occurrence.

Optionally, the at least one event is identified by the user based on a selection from a library of predefined, stored events displayed on the at least one graphical interface.

Optionally, the prop is identified by the user based on a selection from a library of predefined props listed on the at least one graphical interface.

Optionally, identification of the prop causes a graphical representation of the prop to be displayed on the at least one graphical interface, wherein the at least one actuator is displayed overlaid on the graphical representation of the prop.

Optionally, the at least one event and the associated time of occurrence are assigned to a single actuator, wherein the at least one event results in a localized physical contact on a predefined position of the prop.

Optionally, the at least one event and the associated time of occurrence are assigned to more than one actuator, wherein the at least one event results in a distributed stimuli over more than one position on the prop.

Optionally, the feedback is delivered in sync with the time of occurrence of the at least one event. Optionally, the prop is a body suit. Optionally, the prop is a gun, wherein the at least one actuator is positioned in a hilt of the gun.

Optionally, the plurality of parameters includes form, intensity, duration and pattern of the feedback. Optionally, the form includes vibration, electrical pulse or force based stimuli, the intensity includes low, medium or high settings, the duration includes low, medium or extended settings and the pattern includes short-on/short-off or long-on/long-off setting.

Optionally, the at least one actuator is activated automatically in response to the at least one event taking place at the associated time of occurrence.

Optionally, the at least one actuator is activated manually by the user in response to the at least one event taking place at the associated time of occurrence.

Optionally, the feedback is accompanied with audio and/or visual cues.

Optionally, the feedback is accompanied with audio generated from one or more speakers, said one or more speakers being in data communication with the user's computing device, wherein the audio is generated in sync with the time of occurrence of the at least one event.

The present specification also discloses a system for enabling an actor to perform in synchronization with at least one event occurring during a scene, the system comprising: at least one prop adapted to be worn, held or carried by the actor; one or more actuators positioned at predefined locations on the at least one prop, wherein the one or more actuators are configured to generate and deliver haptic feedback to the actor; a plurality of programmatic instructions stored in a non-transient memory and adapted to execute on a computing device, wherein, upon execution, the programmatic instructions are configured to: generate at least one graphical interface adapted to receive inputs from a user; receive, via the at least one graphical interface, an identification of at least one event occurring during a course of the scene; associate, via the at least one graphical interface, at least a time of occurrence to the at least one event within an overall duration of the scene; receive, via the at least one graphical interface, an identification of the at least one prop; assign, via the at least one graphical interface, the at least one event and the associated time of occurrence to at least one actuator on the at least one prop; configure, via the at least one graphical interface, at least one of a plurality of parameters of the feedback; and activate the at least one actuator to generate and deliver the feedback to the actor in response to the at least one event taking place at the associated time of occurrence.

Optionally, the at least one event is identified by the user based on a selection from a library of predefined, stored events displayed on the at least one graphical interface.

Optionally, the at least one prop is identified by the user based on a selection from a library of predefined props listed on the at least one graphical interface.

Optionally, identification of the at least one prop causes a graphical representation of the at least one prop to be displayed on the at least one graphical interface, wherein the at least one actuator is displayed overlaid on the graphical representation of the at least one prop.

Optionally, the at least one event and the associated time of occurrence are assigned to a single actuator, wherein the at least one event results in a localized physical contact on a predefined position of the at least one prop.

Optionally, the at least one event and the associated time of occurrence are assigned to more than one actuator, wherein the at least one event results in a distributed stimuli over more than one position on the at least one prop.

Optionally, the feedback is delivered in sync with the time of occurrence of the at least one event. Optionally, the at least one prop is a body suit. Optionally, the at least one prop is a gun, wherein the at least one actuator is positioned in a hilt of the gun.

Optionally, the plurality of parameters includes form, intensity, duration and pattern of the feedback. Optionally, the form includes vibration, electrical pulse or force based stimuli, the intensity includes low, medium or high settings, the duration includes low, medium or extended settings and the pattern includes short-on/short-off or long-on/long-off setting.

Optionally, the at least one actuator is activated automatically in response to the at least one event taking place at the associated time of occurrence.

Optionally, the at least one actuator is activated manually by the user in response to the at least one event taking place at the associated time of occurrence.

Optionally, the feedback is accompanied with audio and/or visual cues.

Optionally, the feedback is accompanied with audio generated from one or more speakers, said one or more speakers being in data communication with the user's computing device, wherein the audio is generated in sync with the time of occurrence of the at least one event.

The present specification also discloses a computer readable non-transitory medium comprising a plurality of executable programmatic instructions wherein, when said plurality of executable programmatic instructions are executed by a processor, a process for enabling a user to configure one or more actuators positioned on a prop to generate and deliver feedback to an actor associated with the prop is performed, said plurality of executable programmatic instructions comprising: generating at least one graphical interface adapted to receive user inputs; receiving, via the at least one graphical interface, an identification of at least one event occurring during a course of a scene; associating, via the at least one graphical interface, a time and duration of occurrence to the at least one event within an overall duration of the scene; receiving, via the at least one graphical interface, an identification of the prop; assigning, via the at least one graphical interface, the at least one event and the associated time and duration of occurrence to at least one actuator on the prop; configuring, via the at least one graphical interface, at least one of a plurality of parameters of the feedback; and activating the at least one actuator to generate and deliver the feedback to the actor in response to the at least one event taking place at the associated time of occurrence.

Optionally, the at least one event is identified by the user based on a selection from a library of predefined, stored events displayed on the at least one graphical interface.

Optionally, the prop is identified by the user based on a selection from a library of predefined props listed on the at least one graphical interface. Optionally, identification of the prop causes a graphical representation of the prop to be displayed on the at least one graphical interface, wherein the at least one actuator is displayed overlaid on the graphical representation of the prop.

Optionally, the at least one event and the associated time and duration of occurrence are assigned to a single actuator, wherein the at least one event results in a localized physical contact on a predefined position of the prop.

Optionally, the at least one event and the associated time and duration of occurrence are assigned to more than one actuator, wherein the at least one event results in a distributed stimuli over more than one position on the prop.

Optionally, the feedback is delivered in sync with the time of occurrence of the at least one event. Optionally, the prop is a body suit. Optionally, the prop is a gun, wherein the at least one actuator is positioned in a hilt of the gun.

Optionally, the plurality of parameters include form, intensity, duration and pattern of the feedback. Optionally, the form includes vibration, electrical pulse or force based stimuli, the intensity includes low, medium or high settings, the duration includes low, medium or extended settings and the pattern includes short-on/short-off or long-on/long-off setting.

Optionally, the at least one actuator is activated automatically in response to the at least one event taking place at the associated time of occurrence.

Optionally, the at least one actuator is activated manually by the user in response to the at least one event taking place at the associated time of occurrence.

Optionally, the feedback is accompanied with audio and/or visual cues.

Optionally, the feedback is accompanied with audio generated from one or more speakers, said one or more speakers being in data communication with the processor, and wherein the audio is generated in sync with the time of occurrence of the at least one event.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings:

FIG. 3 is a flowchart of a method of configuring one or more actuators positioned on a prop to generate and deliver tactile haptic feedback or stimuli to an actor, in accordance with some embodiments of the present specification.

DETAILED DESCRIPTION

Figure 1A:
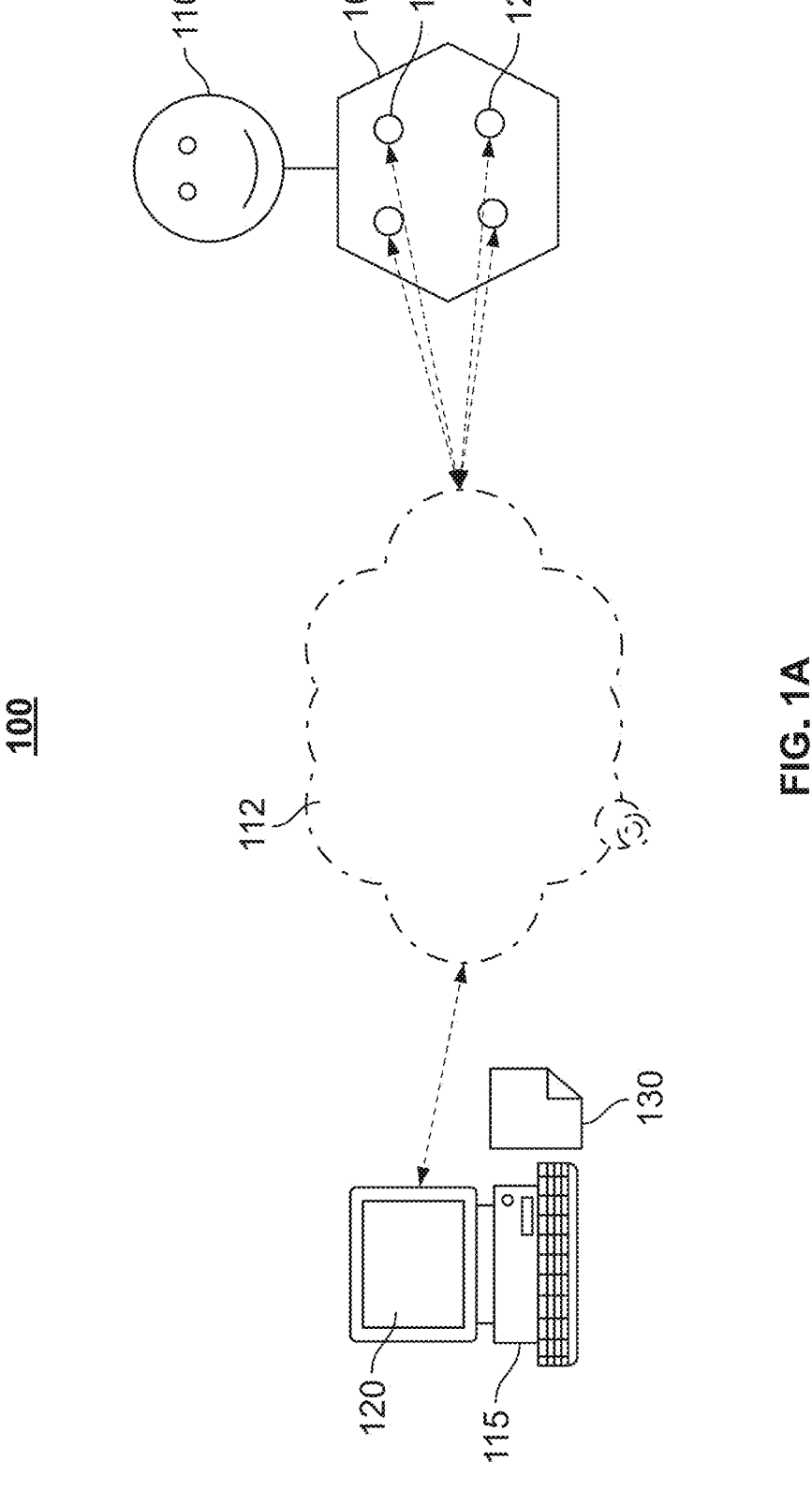
FIG. 1A shows a motion capture reference system, in accordance with some embodiments of the present specification.

The term "prop" used in this disclosure refers to a physical object used on stage by actors during a performance or screen production. In some embodiments, a prop is considered to be anything capable of being worn, held or carried by actors, or being physically manipulated by actors, and is distinct from the actors, background scenery and electrical equipment, for example.

In various embodiments, a motion capture reference system of the present specification includes at least one processor capable of processing programmatic instructions, has a memory capable of storing programmatic instructions, and employs software comprised of a plurality of programmatic instructions for performing the processes described herein. In embodiments, a computer-readable non-transitory medium comprises the plurality of executable programmatic instructions. In one embodiment, the at least one processor is a computing device capable of receiving, executing, and transmitting a plurality of programmatic instructions stored on a volatile or non-volatile computer readable medium.

The term "module" used in this disclosure may refer to computer logic utilized to provide a desired functionality, service or operation by programming or controlling a general purpose processor. Stated differently, in some embodiments, a module implements a plurality of instructions or programmatic code to cause a general purpose processor to perform one or more functions. In various embodiments, a module can be implemented in hardware, firmware, software or any combination thereof. The module may be interchangeably used with unit, logic, logical block, component, or circuit, for example. The module may be the minimum unit, or part thereof, which performs one or more particular functions.

In various embodiments, a "computing device" includes an input/output controller, at least one communications interface and system memory. In various embodiments, the computing device includes conventional computer components such as a processor, necessary non-transient memory or storage devices such as a RAM (Random Access Memory) and disk drives, monitor or display and one or more user input devices such as a keyboard and a mouse. In embodiments, the user input devices allow a user to select objects, icons, and text that appear on the display via a command such as a click of a button on a mouse or keyboard or alternatively by touch in embodiments where the display is a touch-enabled screen. The computing device may also include software that enables wireless or wired communications over a network such as the HTTP, TCP/IP, and RTP/RTSP protocols. These elements are in communication with a central processing unit (CPU) to enable operation of the computing device. In various embodiments, the computing device may be a conventional standalone computer, a mobile phone, a tablet or a laptop. In some embodiments, the functions of the computing device may be distributed across multiple computer systems and architectures.

In some embodiments, execution of a plurality of sequences of programmatic instructions or code enables or causes the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phrascology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

As used herein, the term actor refers to a human person, who is the subject of a motion capture system, wears clothing having markers attached at various locations to enable digital cameras to record the being's movement, and/or is expected to move as guided by the motion capture movement reference system of the present specification.

FIG. 1A shows a motion capture (hereinafter referred to as "mocap") reference system 100 comprising at least one prop 105 worn, held and/or carried by an actor 110 and that includes one or more tactile haptic actuators 125 positioned at one or more predefined coordinates, locations or positions on the at least one prop 105. The one or more tactile haptic actuators 125 are in data communication, via a wired or wireless network 112, with a computing device 115 and a display 120, in accordance with some embodiments.

In various embodiments, the at least one prop 105 comprises items that may be worn such as, but not limited to, body suits, jackets, vests, armors, helmets, caps, shoes, gloves, pads (elbow, knee and hand) and face masks as well as items that may be held and/or carried such as, but not limited to, shields, flags and weapons such as guns, knives, and swords, for example.

In various embodiments, the one or more actuators 125 are capable of generating kinesthetic feedback or stimuli to the actor 110 and may be of different types such as, for example, piezoresistive, piezoelectric, capacitive and elastoresistive. In some embodiments, the one or more actuators 125 generate and deliver feedback or stimuli, to the actor 110, in the form of vibrations. In some embodiments, the one or more actuators 125 are eccentric rotating mass (ERM) actuators, consisting of an unbalanced weight attached to a motor shaft. As the shaft rotates, the spinning of this irregular mass causes the actuator and the attached device to shake. In some embodiments, the one or more actuators 125 accomplish their vibrations with a linear resonant actuator (LRA), which moves a mass in a reciprocal manner by means of a magnetic voice coil, similar to how AC electrical signals are translated into motion in the cone of a loudspeaker. Persons of ordinary skill in the art would appreciate that LRAs are capable of quicker response times than ERMs, and thus can transmit more accurate haptic feedback or stimuli.

In embodiments, a wireless module/transceiver module or wireless functionalities are embedded within each of the actuators 125. The wireless module may be, in one embodiment, a WiFi microprocessor that enables actuators 125 to execute instructions provided by the microprocessor or computing device 115. In embodiments, the wireless module is in data communication with the actuators 125. In some embodiments, the wireless module is a microcontroller that has a small footprint and has low power requirements. In some embodiments, the computing device 115 is remotely located that communicates wirelessly with the wireless module to operate the actuators 125. In embodiments, the computing device/processor 115 communicates commands or instructions that are executable by the actuators 125. In various embodiments, the processor 115 may be a personal computer, a laptop, a portable computing device, or any other electronic device that enables creating instructions that are executable by the actuators 125 and can communicate those instructions wirelessly to wireless module. In embodiments, the wireless module is a Radio Frequency (RF) module, a Wi-Fi module, a Bluetooth module, or any other module capable of facilitating wireless communication between the computing device 115 and the actuators 125. In some embodiments, each of the one or more actuators 125 further comprises an RFID (Radio Frequency Identification) tag that uniquely identifies each actuator.

In embodiments, the one or more actuators 125 are positioned at one or more predefined and desired coordinates, locations or positions on the at least one prop 105. These one or more coordinates, locations or positions are then mapped to unique identifications of the positions of the one or more actuators 125. In embodiments, the position of an actuator on a prop is determined by surveying, calibrating, measuring or acquiring a digital representation for mapping the accurate positions on the prop. Thus, the desired position of the actuator is coded on the prop and the actuator is placed on that prop visually or by leveraging a tracking object (such as a mocap marker) or measuring the position relative to the physical characteristics of the prop.

Figure 1B:
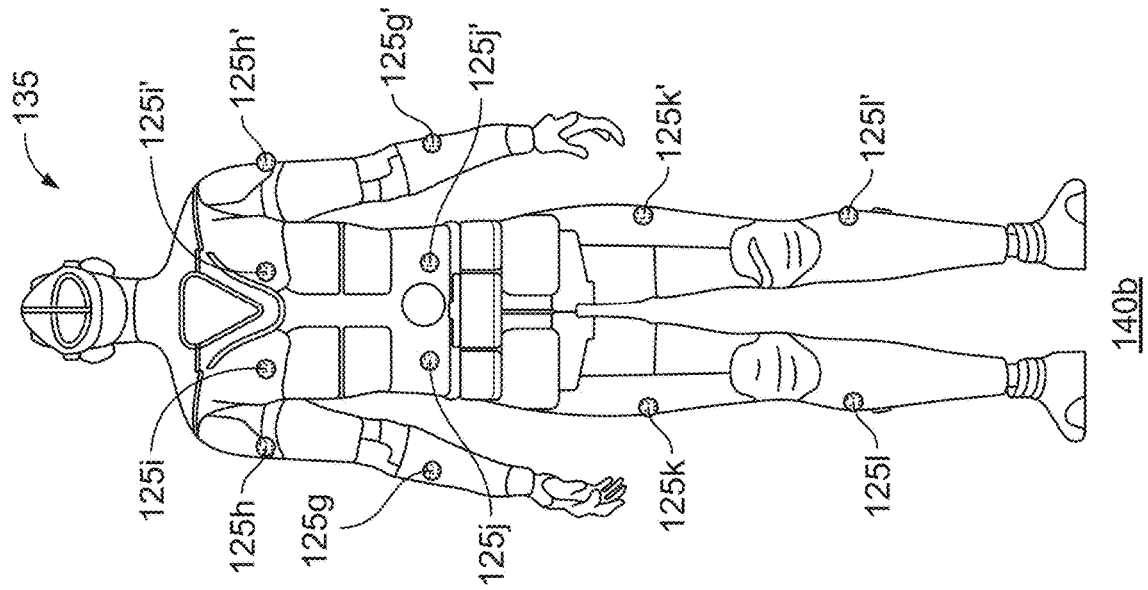
FIG. 1B is a prop in the form of a motion capture body suit equipped with one or more actuators, in accordance with some embodiments of the present specification.
Figure 1B:
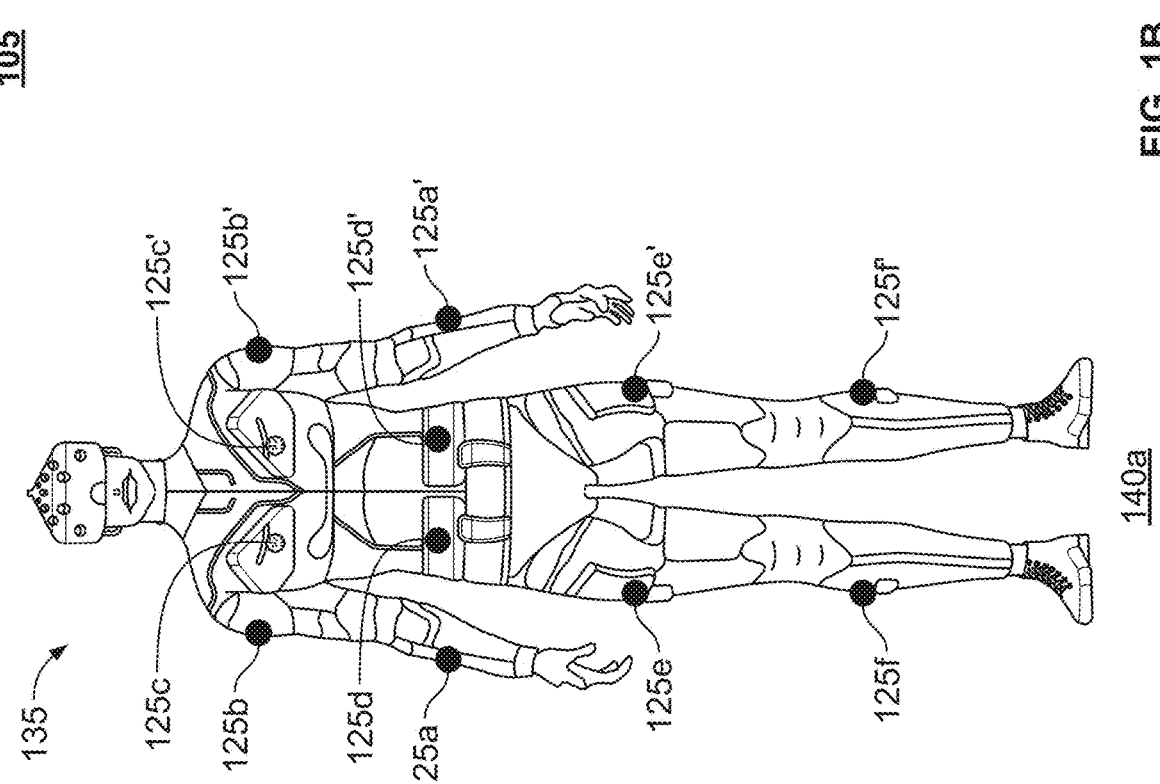

As a non-limiting illustration, FIG. 1B shows a prop 105 configured as a mocap body suit 135 being worn by the actor 110, in accordance with some embodiments of the present specification. The front view 140a shows a plurality of actuators positioned at predefined coordinates, locations or positions on a front-facing side of the suit 135. Similarly, the rear view 140b also shows a plurality of actuators positioned at predefined coordinates, locations or positions on a rear-facing side of the suit 135.

As shown in the front view 140a, in an exemplary embodiment, a first actuator 125a is positioned on the left lower arm, a second actuator 125b is positioned on the left upper arm, a third actuator 125c is positioned on the left chest, a fourth actuator 125d is positioned on the left abdomen, a fifth actuator 125e is positioned on the left thigh and a sixth actuator 125f is positioned on the left crus. Similarly, a seventh actuator 125a' is positioned on the right lower arm, an eighth actuator 125b' is positioned on the right upper arm, an ninth actuator 125c' is positioned on the right chest, a tenth actuator 125d' is positioned on the right abdomen, an eleventh actuator 125e' is positioned on the right thigh and a twelfth actuator 125f' is positioned on the right crus.

As shown in the rear view 140b, in an exemplary embodiment, an thirteenth actuator 125g is positioned on the left lower arm, a fourteenth actuator 125h is positioned on the left upper arm, a fifteenth actuator 125i is positioned on the left upper-back, a sixteenth actuator 125j is positioned on the left lower-back, a seventeenth actuator 125k is positioned on the left thigh and a eighteenth actuator 125l is positioned on the left crus. Similarly, an nineteenth actuator 125g' is positioned on the right lower arm, a twentieth actuator 125h' is positioned on the right upper arm, a twenty-first actuator 125i' is positioned on the right upper-back, a twenty-second actuator 125j' is positioned on the right lower-back, a twenty-third actuator 125k' is positioned on the right thigh and a twenty-fourth actuator 125l' is positioned on right crus.

Referring back to FIG. 1A, it should be appreciated that the number of actuators 125 and their positioning on a prop 105 (such as the suit 135 of FIG. 1B) would vary in various embodiments depending at least upon a type of prop 105 being used along with the number and nature, characteristic or type of the one or more predefined events occurring in accordance with a script being enacted by the actor 110. Thus, the number and positioning of the actuators 125 are determined based on a predefined positioning protocol or scheme suited or relevant to the scripted events and actions of a scene. In embodiments, the one or more predefined events are those that must elicit or evoke a relevant reaction, outcome or response from the actor 110.

In some embodiments, the nature, characteristic or type of the at least one event is such that the at least one event results in a physical contact with the body of the actor 110 during performance. For example, the actor 110 getting hit by one or more bullets or punches on his body. In some embodiments, the nature, characteristic or type of the at least one event is such that the at least one event results in a force or effect to be felt by the actor 110 during performance without any physical contact. For example, the actor 110 may feel the force of a shockwave resulting from one or more explosions. In some embodiments, the nature, characteristic or type of the at least one event is such that the at least one event has a localized or targeted physical contact on the body of the actor 110. For example, the actor 110 may receive a bullet on his right upper arm region. In some embodiments, the nature, characteristic or type of the at least one event is such that the at least one event has a distributed physical contact or non-contact influence on the actor 110. For example, the actor 110 may get hit by a plurality of punches (contact influence) all over his trunk or the actor 110 may experience strong wind (non-contact influence) on his back from an approaching storm or at least one explosion. Accordingly, an event may be defined as any occurrence, such as an explosion, gunfire, physical altercation, collision, among other actions, in a motion capture script that would require, in response, a physical response from the motion capture actor.

In accordance with aspects of the present specification, the one or more actuators 125 are programmed to generate and deliver tactile haptic feedback or stimuli to the actor 110. In some embodiments, the tactile or haptic feedback may be in the form of a vibration produced by electronics (motor or signal) or sound. In some other embodiments, feedback or stimuli can be provided via a physical actuator, a fluid/pressure differential, or heat/electric shock. In some embodiments, the tactile haptic feedback or stimuli is delivered in sync, tandem or in-time with occurrence of one or more predefined events while the actor 110 is performing in accordance with a script of an act or play. In embodiments, feedback or stimuli may be programmed to be associated with or correlate to a predefined event. For example, feedback or stimuli may represent, but is not limited to, a type of motion, an intensity of action or motion, a direction, a length of time, or a minimum or maximum area. Such feedback or stimuli, provided to the actor 110 during his mocap performances, enable the actor 110 to stay in sync with the occurrence of the one or more predefined events in the script and thereby deliver more realistic performances.

Figure 2A:
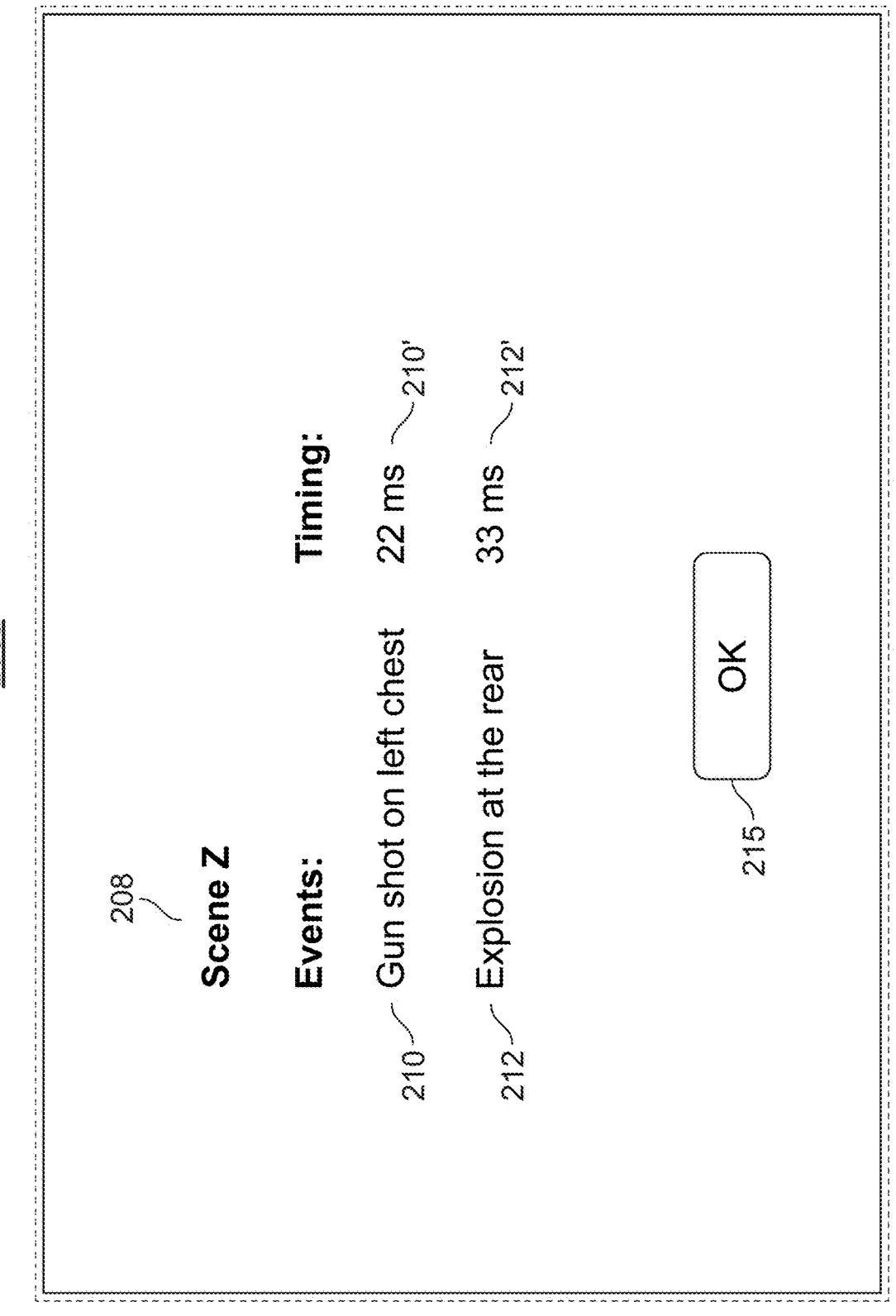
FIG. 2A is a first GUI (Graphical User Interface) screen generated by a scripting module, in accordance with some embodiments of the present specification.

In accordance with aspects of the present specification, the computing device 115 stores a scripting module 130 that, when executed, implements a plurality of programmatic instructions or code to generate at least one front-end GUI (Graphical User Interface) to enable an administrator to:

Select, in some embodiments, at least one event from a first list or library of predefined events scripted to occur during the course of a scene. Alternatively, in some embodiments, if the first list or library of events does not include one or more specific or customized events, the administrator may define such one or more specific or customized events as needed. FIG. 2A shows a first GUI screen 205a generated by the scripting module 130 (FIG. 1A), in accordance with some embodiments of the present specification. The screen 205a enables the administrator to define or select a first event 210 and a second event 212 for a scene 208. As an illustrative example, the first event 210 is that of a gun-shot being received by an actor on his left chest while the second event 212 is that of a grenade exploding behind the actor.

Associate a specific time of occurrence to the at least one event within an overall duration of the scene. Referring again to FIG. 2A, the screen 205a enables the administrator to assign a first time 210' of occurrence to the first event 210 and a second time 212' of occurrence to the second event 212 within an overall duration of 'T' seconds for the scene 208. As an illustrative example, the first time 210' may correspond to 22 seconds from a beginning of the scene 208 while the second time 212' may correspond to 33 seconds from the beginning of the scene 208, wherein the overall duration 'T' is 120 seconds for the scene 208. When the administrator clicks an 'ok' button 215, the scripting module 130 generates the first and second events 210, 212 and assigns (and stores) the first and second times 210', 212' to the first and second events 210, 212 respectively.

Additionally, in some embodiments, a specific duration of time may also be associated with the at least one event within an overall duration of the scene. For example, the first event 210 occurring at the first time 210' may be associated with a duration of $t_1$ seconds. Similarly, the second event 212 occurring at the second time 212' may be associated with a duration of $t_2$ seconds. Thus, since the first and second events 210, 212 are programmed to occur respectively over the durations of $t_1$ and $t_2$ seconds the corresponding actuators would generate stimuli over the durations of $t_1$ and $t_2$ seconds, in some embodiments. However, in alternate embodiments, the corresponding actuators may generate stimuli over durations that may be different, for example shorter, than the durations of $t_1$ and $t_2$ seconds.

Figure 2B:
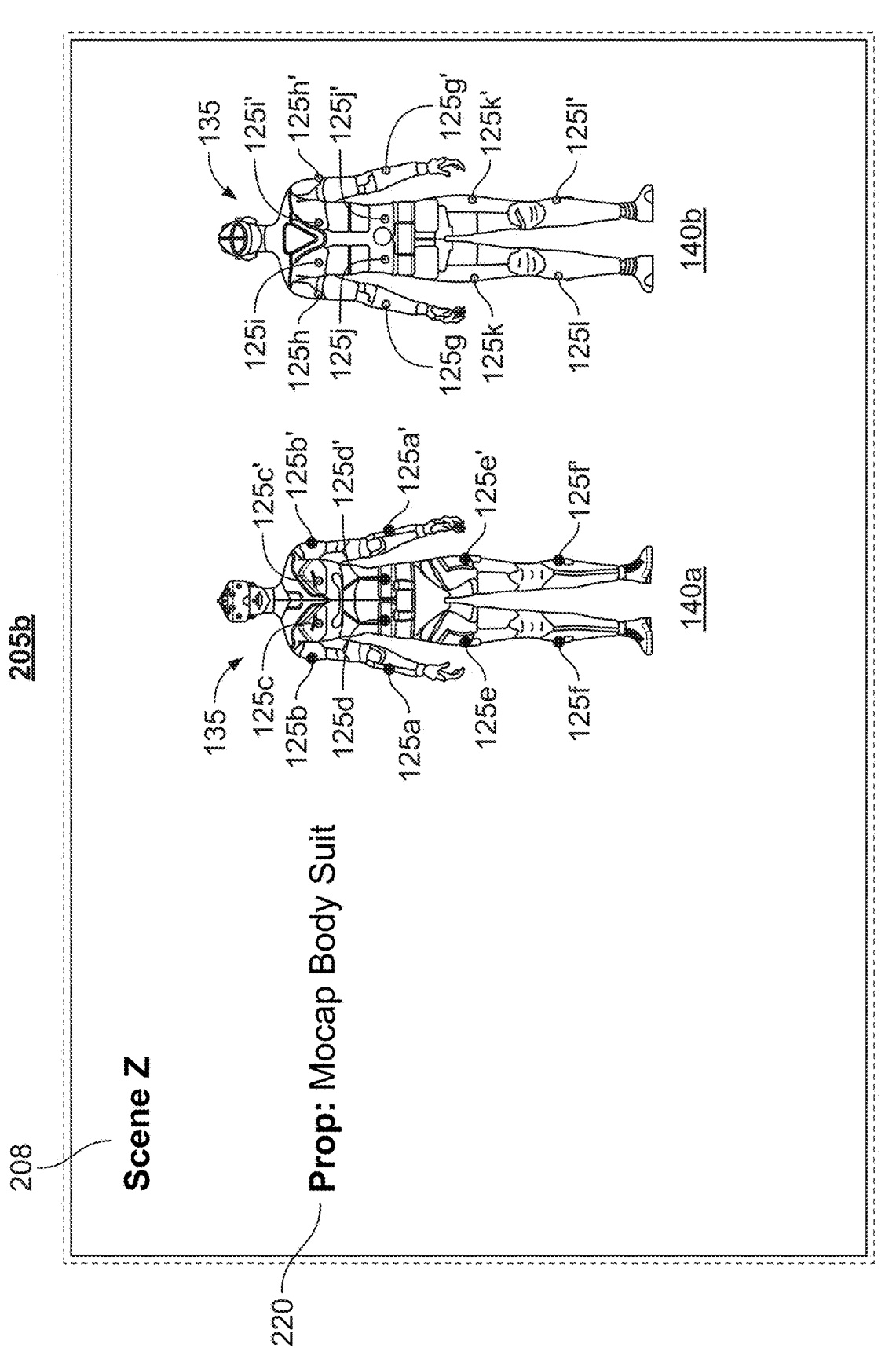
FIG. 2B is a second GUI (Graphical User Interface) screen generated by a scripting module, in accordance with some embodiments of the present specification.

Select a prop (from a library or list of predetermined or predefined props relevant to the scene and the events) being worn, held and/or carried by the actor while performing during the course of the scene. In some embodiments, selection of the prop provides the administrator with a corresponding display, preferably graphical, and access to a plurality of tactile haptic feedback actuators that are pre-positioned on the prop. In some embodiments, the plurality of actuators are displayed overlaid on a graphical representation of the prop on the at least one GUI. FIG. 2B shows a second GUI screen 205b generated by the scripting module 130, in accordance with some embodiments of the present specification. The screen 205b enables the administrator to select a first prop 220 that the actor would use during the scene 208. As an illustrative example, the first prop 220 is the mocap body suit 135 of FIG. 1B. Once the mocap body suit 135 is selected, the screen 205b provides a graphical representation of the front and rear views 140a, 140b of the suit 135 along with a plurality of actuators 125 positioned on the front and rear sides of the suit 135 in accordance with a predefined positioning protocol or scheme suited or relevant to the scripted events and actions of the scene 208. In one embodiment, the predefined positioning protocol or scheme of the plurality of actuators 125 corresponds to that described earlier with reference to FIG. 1B.

Figure 2C:
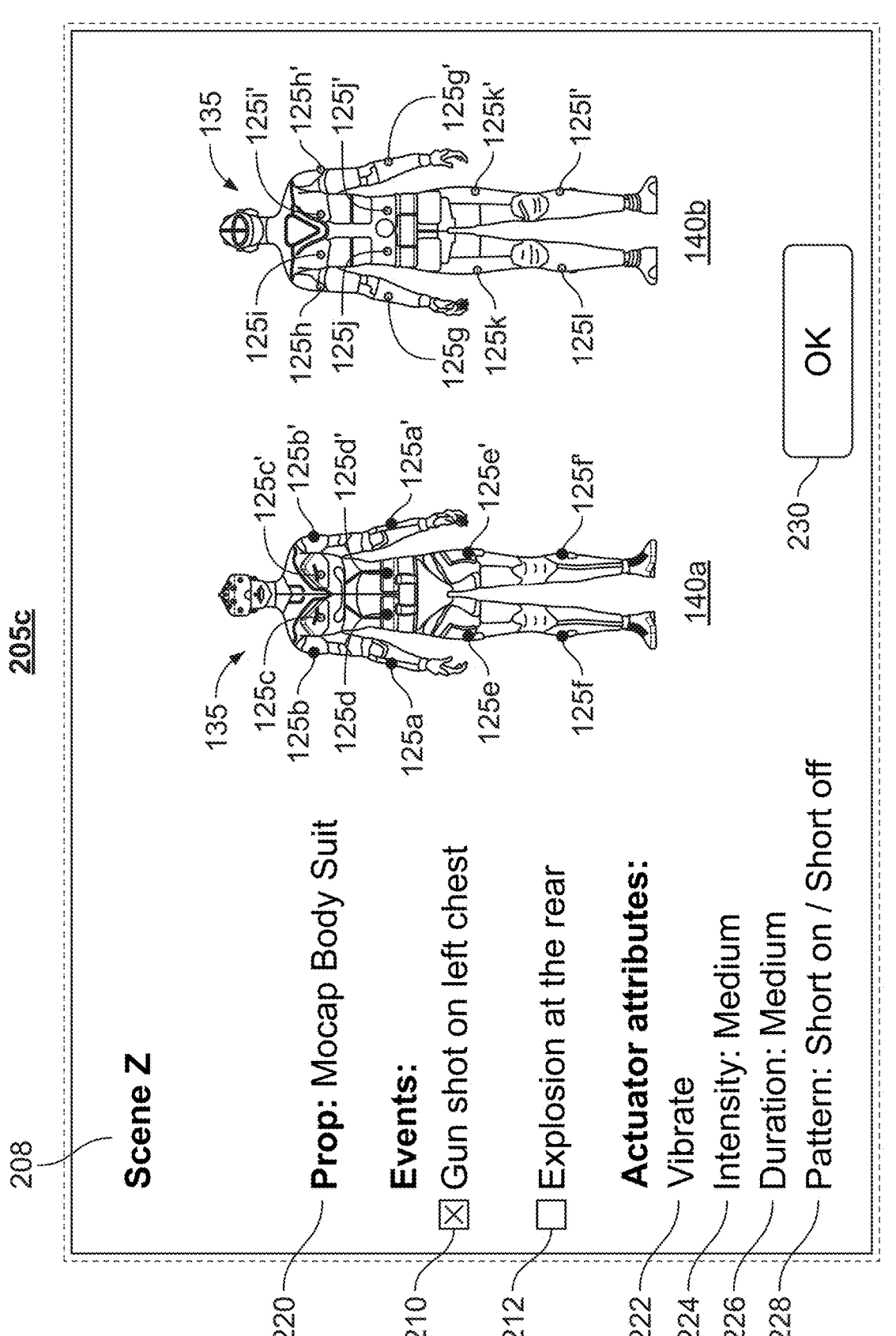
FIG. 2C is a third GUI (Graphical User Interface) screen generated by a scripting module, in accordance with some embodiments of the present specification.

Assign the at least one event, its associated time of occurrence and/or its associated duration of occurrence to at least one actuator on the prop. In various embodiments, a choice of the at least one actuator, to which an event is assigned, depends upon the nature, characteristic or type of the at least one event. FIG. 2C shows a third GUI screen 205c generated by the scripting module 130, in accordance with some embodiments of the present specification. In some embodiments, the screen 205c is displayed when the administrator clicks on the suit 135 graphically displayed on the screen 205b. The screen 205c displays the first and second events 210, 212 that are available to be assigned. The administrator selects the first event 210 and then clicks on the actuator 125c for assigning since the first event 210 corresponds to that of a gun-shot being received by the actor on his left chest region and the actuator 125c is positioned on the left chest area or region of the suit 135. In some embodiments, assigning of the first event 210 also automatically assigns the associated first time 210' (screen 205a) to the actuator 125c along with the associated time duration.

Figure 2D:
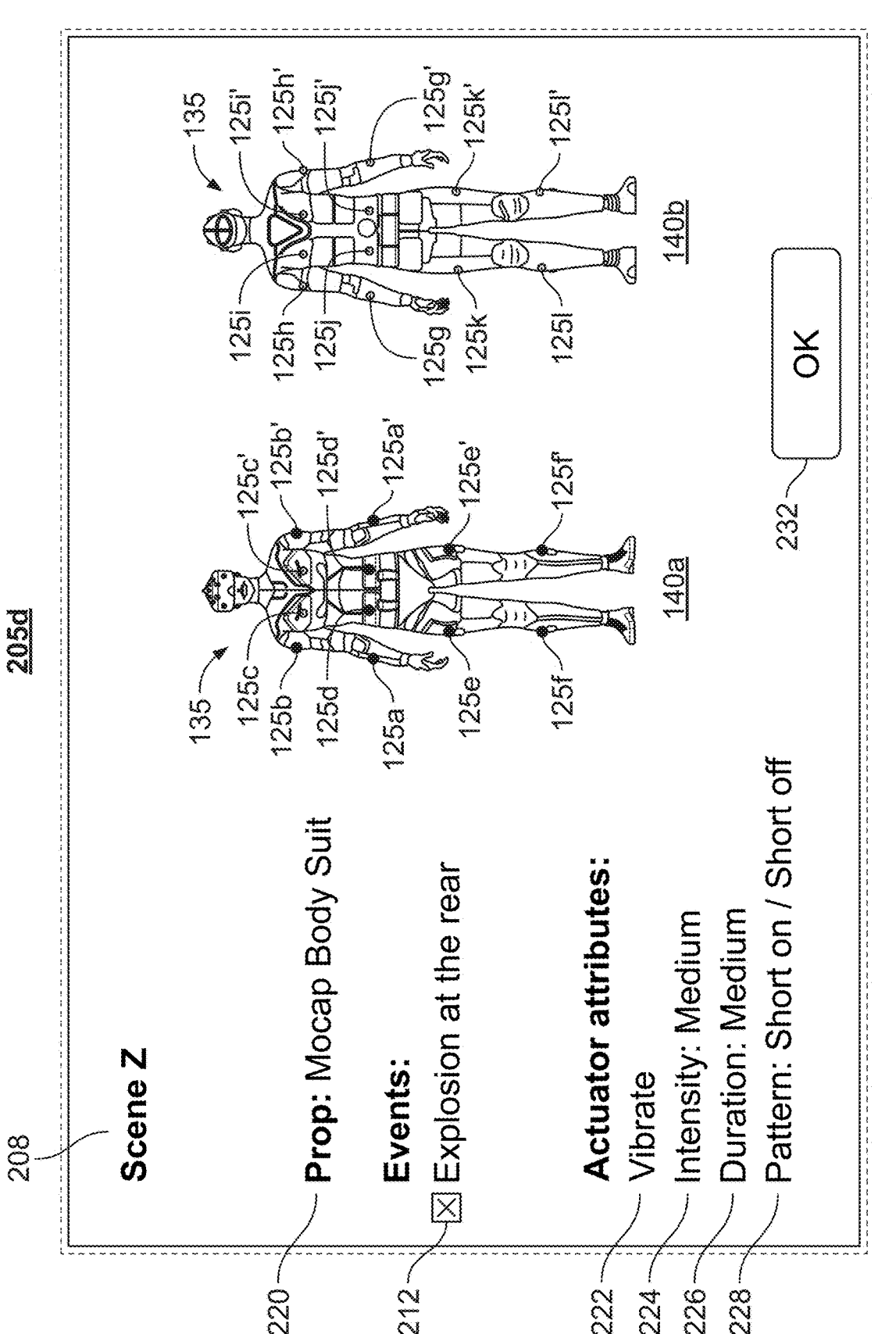
FIG. 2D is a fourth GUI (Graphical User Interface) screen generated by a scripting module, in accordance with some embodiments of the present specification.

In some embodiments, an event, its associated time of occurrence and its associated time duration of occurrence may be assigned to a plurality of actuators (as opposed to just one actuator) depending upon the nature, characteristic or type of the event. As shown in FIG. 2D, the screen 205d is displayed when the administrator clicks on the suit 135 graphically displayed on the screen 205b. The screen 205d now displays only the second event 212 that is available to be assigned (since the first event 210 has already been assigned to the actuator 125c). The administrator now selects the second event 212 and then clicks on, say, all actuators 125a', 125b', 125c' 125d', 125e' and 125f' (positioned on the rear side of the suit 135) for assigning since the second event 212 corresponds to that of the grenade exploding behind the actor. Thus, in this example, feedback or stimuli corresponding to a shock wave from the exploding grenade, to be felt by the actor on his back or dorsal side, is delivered to the actor through multiple actuators.

Accordingly, in various embodiments, a localized and/or targeted haptic feedback or stimuli is generated by a specifically positioned actuator on a prop while a more distributed/spread haptic feedback or stimuli is generated through a plurality of actuators. The localized/targeted haptic feedback or stimuli may correspond to a localized/targeted event such as, for example, a bullet being fired at a specific area or region of the actor's body, or a punch or blow being placed at a specific area or region of the actor's body. The distributed/spread haptic feedback or stimuli may correspond to a non-targeted event such as, for example, an explosion occurring, a fusillade of bullets being fired or a stormy wind being felt. In some embodiments, haptic profiles may be created. For example, for an explosion within a 3D scene, the system would automatically calculate the blast fall-off, blast intensity, blast impact area and other characteristics of the explosion and then would determine which actuators would receive which signal, including type and duration of the signal. In another example, a .22 caliber bullet hit may be represented by one actuator with its minimal impact; a shotgun bullet hit may trigger 'n', for example, approximately 6, actuators with its medium impact; and a .50 caliber bullet hit may trigger one actuator with heavy impact along with surrounding actuators for fall-off or scatter impact. An exemplary GUI may be used to configure a distributed/spread haptic feedback to target a physical location (and therefore, a plurality of actuators in the physical location) on the body rather than a specific actuator location.

Set a plurality of parameters, attributes or characteristics of the haptic feedback to be generated by the at least one actuator. Referring again to FIG. 2C, in some embodiments, the screen 205c also enables the administrator to choose and program a plurality of attributes or characteristics of the haptic feedback generated by the actuator 125c. As an illustrative example, a first attribute 222 relates to a form of haptic feedback to be generated. For example, the administrator may choose from a vibrational, electrical pulse or a force stimuli or feedback. A second attribute 224 may relate to an intensity of the haptic feedback to be generated. For example, the administrator may choose one of a low, medium or high intensity setting. A third attribute 226 may relate to a duration or length of time of the haptic feedback to be generated. For example, the administrator may choose from a low, medium or extended duration setting. In some embodiments, the low, medium, or extended duration setting may respectively correspond to first, second and third predefined time durations of occurrence associated with the at least one event. In some embodiments, instead of the predefined low, medium or extended duration setting actual or absolute duration or length of time of the haptic feedback to be generated may be input. A fourth attribute 228 may relate to a pattern of the haptic feedback to be generated. For example, the administrator may choose from short-on/short-off and long-on/long-off wherein the short-on/short-off may correspond to, say, 200 milliseconds while the long-on/long-off may correspond to, say, 600 milliseconds. Persons of ordinary skill in the art would appreciate that the first, second, third and fourth attributes described above are only exemplary and should in no way be construed limiting. Also, in various embodiments, the plurality of attributes may be preset or pre-programmed with default settings. Persons of ordinary skill in the art would appreciate that the screen 205d also enables the administrator to choose and program a plurality of attributes or characteristics (such as, say, the first, second, third and fourth attributes 222, 224, 226, 228) of the haptic feedback generated by the actuators 125a', 125b', 125c' 125d', 125e' and 125f' similar to that of the actuator 125c illustrated with reference to FIG. 2C.

Activate the at least one actuator to deliver haptic feedback to the actor for a specific time duration in response to the at least one event occurring at the assigned specific time during the course of the scene. In some embodiments, all actuators positioned on a prop (such as, the mocap body suit 135) are in a deactivated or disabled state by default. In some embodiments, the scripting module 130 automatically prompts, signals or activates a specific actuator to generate and deliver a tactile haptic feedback or stimuli to the actor in accordance with the programmed time of occurrence of an event assigned to the specific actuator. In alternate embodiments, the administrator may manually activate a specific actuator, such as by clicking on a graphic representation of the specific actuator on a display associated with his computing device or by clicking a corresponding short-cut key, for example, on a keyboard associated with his computing device.

In some embodiments, at least two actors using haptic props with controls may directly trigger haptic events. For example, the aim of a prop gun may be tracked, triggering a command to send a haptic hit to a matched point of virtual contact and timing.

Referring to FIGS. 2C and 2D, on clicking the 'ok' button 230, 232 assignment of the first event 210 to the actuator 125c, assignment of the second event 212 to the actuators 125a', 125b', 125c' 125d', 125e', 125f' as well as configurations of the first, second, third and fourth attributes 222, 224, 226, 228 of the one or all of these actuators are configured and stored by the scripting module 130.

During operation, while the actor is performing during the course of the scene 208, the first event 210 of a bullet being fired at the actor on his left chest region will occur at the first time 210'. Accordingly, the scripting module 130 will prompt, signal and enable the actuator 125c to generate and deliver a pre-configured vibratory feedback or stimuli to the actor (on his left chest region), for the configured duration of time $t_1$, thereby goading and aiding the actor to react in sync with the first event 210. Similarly, when the second event 212 of a grenade exploding behind or at the back of the actor will occur at the second time 212'—the scripting module 130 will prompt, signal and enable the actuators 125a', 125b', 125c' 125d', 125e', 125f' to generate and deliver pre-configured vibratory feedback or stimuli to the actor (on his entire rear or back region), for the configured duration of time $t_2$, thereby goading and aiding the actor to react in sync with the second event 212.

Thus, the mocap body suit 135 can also be used to simulate events that are not necessarily touching the actor in a scene. In other words, in a scene where the actor is fleeing a warzone and is supposed to be experiencing explosions around him, a plurality of actuators on the body suit 135 can be activated simultaneously to indicate the timing and duration of those explosions, again helping with the syncing and realism of the acting. Also, proximity of the explosions can be indicated by modulating the intensity parameter of the haptic feedback generated by the actuators. Stated differently, explosions occurring closer to the actor may be indicated by higher intensity feedback while explosions occurring farther away from the actor may be indicated by comparatively lower intensity feedback.

Referring back to FIG. 1A, in another exemplary use case scenario, the at least one prop 105 may be a simulated weapon such as a sniper rifle. In some embodiments, the rifle may include at least one actuator 125 in the hilt of the rifle. If the actor 110 is supposed to fire the rifle at a specific time during performance of a scene, the scripting module 130 may be programmed to prompt, signal and enable the at least one actuator 125 to generate and deliver vibrational feedback or stimuli to the actor (in the hilt of the gun) at the specific time. Consequently, the actor 110 is reminded and stimulated to fire the rifle at the specific time thereby helping the actor 110 with timing/syncing of the action or event.

In accordance with aspects of the present specification, the programmed tactile haptic feedback or stimuli generated and delivered by one or more actuators in a prop allows the actor to actually feel the sensation and timing of an event as opposed to prior art methods that typically rely only on audio and/or visual cues. Such haptic feedback or stimuli helps with both timing/syncing the performance and also with giving the actor something to enhance the realism of her performance.

In some embodiments, the haptic feedback in the form of, say, vibrations may be accompanied with audio-visual cues that are generated and delivered in synchronization with a time of occurrence of an event. For example, a mocap stage, where the actor is performing during the course of a scene, may be fitted with a plurality of speakers including ceiling mounted speakers. In some embodiments, the speakers are enabled to be in wireless or wired data communication with the computing device 115 and hence may be programmable using the scripting module 130. Accordingly, the scripting module 130 is configured to activate the speakers at a specific time (during the course of a scene) so that the actor 110 is able to perceive a more realistic representation of the audio corresponding to occurrence of an event such as, for example, an airplane flying over above and explosions occurring from the rear. Thus, the audio cue is generated in sync with the time of occurrence of the at least one event. In embodiments, real world physical haptics may be incorporated into the game environment, either controlled in game or via user input. Real world physical haptics may include (among others) wind, sound, smell, temperature changes (heat/cold). In some embodiments, the scripting module 130 is configured to not only activate the speakers at a specific time but also determine a surround sound protocol (such as, Dolby Atmos for example) to be adhered to for an audio track being played.

FIG. 3 is a flowchart of a method 300 of configuring one or more actuators positioned on a prop to generate and deliver tactile haptic feedback or stimuli to an actor, in accordance with some embodiments of the present specification. In embodiments, the method 300 is implemented by the scripting module 130 (FIG. 1A) that when executed generates one or more GUI screens in accordance with the following exemplary steps.

At step 302, the scripting module 130 generates a first GUI screen, on a display of an administrator's computing device, to prompt and enable the administrator to configure or receive an identification of an occurrence of at least one event during a course of a scene. In some embodiments, the administrator uses the first GUI screen to select at least one event from a list or library of predefined events scripted to occur during the course of a scene. Alternatively, in some embodiments, if the list or library of events does not include a specific or customized event, the administrator may define such specific or customized event as needed.

At step 304, in some embodiments, the administrator uses the first GUI screen to associate a specific time of occurrence to the at least one event within an overall duration of the scene. In some embodiments, the administrator uses the first GUI screen to also associate a time duration of occurrence to the at least one event within the overall duration of the scene. At step 306, the scripting module 130 generates a second GUI screen to prompt and enable the administrator to identify and select a prop (from a library or list of predetermined props relevant to the scene and the events) being worn, held and/or carried by the actor while performing during the course of the scene. In some embodiments, selection of the prop provides the administrator with a corresponding display, preferably graphical, and access to a plurality of tactile haptic feedback actuators that are pre-positioned on the prop.

At step 308, the scripting module 130 generates a third GUI screen to prompt and enable the administrator to assign the at least one event, its associated time of occurrence and its associated time duration of occurrence to at least one actuator on the prop. In various embodiments, a choice of the at least one actuator, to which an event is assigned, depends upon the nature, characteristic or type of the at least one event. At step 310, the administrator uses the third GUI screen to set or configure a plurality of parameters, attributes or characteristics of the haptic feedback to be generated by the at least one actuator. In some embodiments, the plurality of parameters, attributes or characteristics comprise elements such as, but not limited to, form, intensity, duration and pattern of the haptic feedback to be generated.

At step 312, the at least one actuator is activated or enabled to deliver haptic feedback for the programmed time duration to the actor in response to the at least one event occurring at the assigned specific time during the course of the scene. In some embodiments, all actuators positioned on a prop are in a deactivated or disabled state by default. In some embodiments, the scripting module 130 automatically prompts, signals or activates the at least one actuator to generate and deliver a tactile haptic feedback or stimuli to the actor in accordance with the programmed time and duration of occurrence of the at least one event assigned to the specific actuator. In alternate embodiments, the administrator may manually activate the at least one actuator-such as by clicking on a graphic representation of the specific actuator on a display associated with his computing device or clicking a corresponding short-cut key, for example, on a keyboard associated with his computing device.

The above examples are merely illustrative of the many applications of the methods and systems of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A physical prop adapted to be worn or held by a user, comprising:
   an object adapted to be worn or held by the user; and
   more than one haptic actuators positioned at predefined locations on the object, wherein each of the more than one haptic actuators is associated with a predefined physical coordinate on the physical prop, wherein the physical coordinate is encoded or stored in association with a unique electronically readable identifier embedded in each of the more than one actuators, wherein the unique electronically readable identifier is readable by a computing device to automatically determine each position of the more than one actuators prior to activation, wherein the more than one haptic actuators are in data communication with the computing device and wherein each of the more than one haptic actuators are configured to be individually activated at different times, based on a signal from the computing device, to simulate characteristics of physical feedback associated with a predefined event.

2. The physical prop of claim 1, wherein the object is at least one of a body suit, a jacket, a vest, armor, a helmet, a cap, a shoe, a glove, an elbow pad, a knee pad, a hand pad, or a face mask.

3. The physical prop of claim 1, wherein the object is at least one of a gun, a shield, a flag, a knife, a sword, or a weapon.

4. The physical prop of claim 1, wherein the characteristics of physical feedback comprise at least one of a type of motion, an intensity of action or motion, a direction, a length of time, or a minimum or maximum area.

5. The physical prop of claim 1, wherein the more than one haptic actuators are at least one of a piezoresistive actuator, a piezoelectric actuator, a capacitive actuator, an elasto-resistive actuator, a linear resonant actuator, or an eccentric rotating mass actuator.

6. The physical prop of claim 1, wherein each electronically readable identifier comprises a Radio Frequency Identification tag that uniquely identifies each of the more than one haptic actuators.

7. The physical prop of claim 1, wherein the object is a body suit having a front side and a back side and wherein the more than one haptic actuators comprise a first actuator positioned on a left lower arm of the front side of the body suit, a second actuator positioned on a left upper arm of the front side of the body suit, a third actuator positioned on a right lower arm of the front side of the body suit, a fourth actuator positioned on a right upper arm of the front side of the body suit, a fifth actuator positioned on a left chest of the front side of the body suit, a sixth actuator positioned on a right chest of the front side of the body suit, a seventh actuator positioned on a left abdomen of the front side of the body suit, and an eighth actuator positioned on a right abdomen of the front side of the body suit.

8. The physical prop of claim 7, wherein at least some of the first actuator, the second actuator, the third actuator, the fourth actuator, the fifth actuator, the sixth actuator, the seventh actuator, and the eighth actuator are configured to be individually activated to simulate a plurality of punches being applied to a wearer of the body suit.

9. The physical prop of claim 7, wherein at least some of the first actuator, the second actuator, the third actuator, the fourth actuator, the fifth actuator, the sixth actuator, the seventh actuator, the eighth actuator, and the eighth actuator are configured to be individually activated to simulate gunfire being experienced by a wearer of the body suit.

10. The physical prop of claim 7, wherein at least some of the first actuator, the second actuator, the third actuator, the fourth actuator, the fifth actuator, the sixth actuator, the seventh actuator, the eighth actuator, and the eighth actuator are configured to be individually activated to simulate explosion being experienced by a wearer of the body suit.

11. The physical prop of claim 7, wherein the more than one haptic actuators further comprise a ninth actuator positioned on a left thigh of the front side of the body suit, a tenth actuator positioned on a right thigh of the front side of the body suit, an eleventh actuator positioned on a left crus of the front side of the body suit and a twelfth actuator positioned on a right crus of the front side of the body suit.

12. The physical prop of claim 1, wherein the object is a body suit having a front side and a back side and wherein the more than one haptic actuators comprise a first actuator positioned on a left lower arm of the back side of the body suit, a second actuator positioned on a left upper arm of the back side of the body suit, a third actuator positioned on a right lower arm of the back side of the body suit, a fourth actuator positioned on a right upper arm of the back side of the body suit, a fifth actuator positioned on a left upper back of the back side of the body suit, a sixth actuator positioned on a right upper back of the back side of the body suit, a seventh actuator positioned on a left lower back of the back side of the body suit, and an eighth actuator positioned on a left lower back of the back side of the body suit.

13. The physical prop of claim 9, wherein the more than one haptic actuators further comprise a ninth actuator positioned on a left thigh of the back side of the body suit, a tenth actuator positioned on a right thigh of the back side of the body suit, an eleventh actuator positioned on a left crus of the back side of the body suit and a twelfth actuator positioned on a back crus of the front side of the body suit.

14. The physical prop of claim 1, wherein the more than one haptic actuators are configured to apply vibrational stimuli or electrical pulse stimuli based on the signal from the computing device.

15. The physical prop of claim 1, wherein the more than one haptic actuators are configured to apply stimuli for a plurality of different time durations based on the signal from the computing device.

16. The physical prop of claim 1, wherein the more than one haptic actuators are configured to apply a stimulation pattern in a coordinated manner based on the signal from the computing device.

17. A physical prop adapted to be worn or held by a user, comprising:

an object adapted to be worn or held by the user;

more than one haptic actuators positioned at predefined locations on the object, wherein each of the more than one haptic actuators is associated with a predefined physical coordinate on the physical prop, wherein the physical coordinate is encoded or stored in association with a unique electronically readable identifier embedded in each of the more than one actuators, wherein the unique electronically readable identifier is readable by a computing device to automatically determine each position of the more than one actuators prior to activation, wherein the more than one haptic actuators are in data communication with the computing device and wherein each of the more than one haptic actuators are configured to be individually activated at different times to apply vibrational stimuli or electrical pulse stimuli for a plurality of different time durations based on a signal from the computing device in order to simulate characteristics of physical feedback associated with a predefined event.

18. The physical prop of claim 17, wherein the more than one haptic actuators are configured to apply a stimulation pattern in a coordinated manner based on the signal from the computing device.

19. The physical prop of claim 17, wherein the object is at least one of a body suit, a jacket, a vest, armor, a helmet, a cap, a shoe, a glove, an elbow pad, a knee pad, a hand pad, a face mask, a gun, a shield, a flag, a knife, a sword, or a weapon.

20. The physical prop of claim 17, wherein the characteristics of physical feedback comprise at least one of a type of motion, an intensity of action or motion, a direction, a length of time, and a minimum or maximum area.

* * * * *